US010889394B2

(12) United States Patent
Ghiotti et al.

(10) Patent No.: US 10,889,394 B2
(45) Date of Patent: Jan. 12, 2021

(54) MACHINE TO MANUFACTURE CARTRIDGES FOR ELECTRONIC CIGARETTES AND PLANT FOR THE PRODUCTION OF PACKAGES CONTAINING SAID CARTRIDGES FOR ELECTRONIC CIGARETTES

(71) Applicant: G.D SOCIETA' PER AZIONI, Bologna (IT)

(72) Inventors: Roberto Claudio Franco Ghiotti, Monte S. Pietro (IT); Stefano Negrini, Calderara di Reno (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 282 days.

(21) Appl. No.: 15/759,259

(22) PCT Filed: Sep. 22, 2016

(86) PCT No.: PCT/IB2016/055669
§ 371 (c)(1),
(2) Date: Mar. 12, 2018

(87) PCT Pub. No.: WO2017/051350
PCT Pub. Date: Mar. 30, 2017

(65) Prior Publication Data
US 2019/0071198 A1   Mar. 7, 2019

(30) Foreign Application Priority Data

Sep. 22, 2015   (IT) .................. 102015000053749

(51) Int. Cl.
*B65B 1/04*       (2006.01)
*B65B 9/04*       (2006.01)
(Continued)

(52) U.S. Cl.
CPC ............... *B65B 9/045* (2013.01); *B65B 1/06* (2013.01); *B65B 1/363* (2013.01); *B65B 5/12* (2013.01);
(Continued)

(58) Field of Classification Search
CPC ..... B29C 51/14; B29L 2031/712; B65B 1/06; B65B 1/363; B65B 11/52; B65B 2220/14;
(Continued)

(56) References Cited

U.S. PATENT DOCUMENTS 2,655,301 A * 10/1953 Riemer .................. B65B 1/363
                                                  221/68
3,073,400 A *  1/1963 Bauder .................. G01G 19/00
                                                  177/56
(Continued)

FOREIGN PATENT DOCUMENTS

EP       1717150 A1   11/2006
EP       2792255 A1   10/2014

OTHER PUBLICATIONS

International Application No. PCT/IB2016/055669, International Search Report and Written Opinion, dated Apr. 11, 2017.
(Continued)

*Primary Examiner* — Chelsea E Stinson
*Assistant Examiner* — Himchan Song
(74) *Attorney, Agent, or Firm* — Marshall, Gerstein & Borun LLP

(57) ABSTRACT

A machine to manufacture cartridges for electronic cigarettes comprising a casing made of plastic material; the manufacturing machine comprises a drum rotating at a predetermined pitch around its own vertical rotation axis, which receives an orderly mass of empty casings from a feeding conveyor, in correspondence to a collecting station, and feeds them through a succession of processing stations;
(Continued)

in which, the first drum is provided with a plurality of peripheral seats, each designed to receive a respective casing and which are divided into groups comprising the same number of seats arranged substantially in line so as to form, in plan view, a polygon on the surface of the first drum; in which the casings of the seats of a same group are simultaneously subjected to the processes in correspondence to the succession of processing stations.

11 Claims, 15 Drawing Sheets

(51) Int. Cl.
  *B65B 65/00*    (2006.01)
  *B65B 1/06*     (2006.01)
  *B65B 1/36*     (2006.01)
  *B65B 5/12*     (2006.01)
  *B29C 51/14*    (2006.01)
  *B29L 31/00*    (2006.01)
  *B65B 11/52*    (2006.01)
  *B65D 83/02*    (2006.01)

(52) U.S. Cl.
  CPC ............ *B65B 65/003* (2013.01); *B29C 51/14* (2013.01); *B29L 2031/712* (2013.01); *B65B 11/52* (2013.01); *B65B 2220/14* (2013.01); *B65B 2220/16* (2013.01); *B65D 83/02* (2013.01)

(58) Field of Classification Search
  CPC ..... B65B 2220/16; B65B 5/12; B65B 65/003; B65B 9/045; B65D 83/02; A24F 47/008; A24F 47/002; A24F 15/00; A24F 40/40
  USPC ...... 53/244–253; 141/71, 81, 144, 146, 102, 141/238
  See application file for complete search history.

(56) References Cited

U.S. PATENT DOCUMENTS

| | | | | |
|---|---|---|---|---|
| 4,061,164 A * | 12/1977 | Sato | ............... | B65B 1/36 141/90 |
| 4,731,979 A * | 3/1988 | Yamamoto | ............... | A61J 3/074 53/281 |
| 4,782,644 A * | 11/1988 | Haarer | ............... | A24C 5/00 53/282 |
| 4,959,943 A * | 10/1990 | Yamamoto | ............... | A61J 3/074 53/282 |
| 5,549,144 A * | 8/1996 | Dworak | ............... | B65B 1/24 141/10 |
| 5,791,127 A * | 8/1998 | Rossi | ............... | B65B 1/363 53/559 |
| 5,855,233 A * | 1/1999 | Bolelli | ............... | A61J 3/074 141/103 |
| 5,966,910 A * | 10/1999 | Ribani | ............... | A61J 3/074 221/173 |
| 6,050,308 A | 4/2000 | Wurst et al. | | |
| 7,677,016 B2 * | 3/2010 | Trebbi | ............... | A61J 3/074 53/253 |
| 8,596,025 B2 * | 12/2013 | Fulper | ............... | A61J 3/074 53/432 |
| 2012/0248005 A1 | 10/2012 | Bergey | | |
| 2014/0311104 A1 * | 10/2014 | Gamberini | ............... | B65B 7/28 53/558 |
| 2017/0021949 A1 * | 1/2017 | Nannetti | ............... | A61J 3/07 |
| 2020/0156811 A1 * | 5/2020 | Milandri | ............... | B65B 1/363 |

OTHER PUBLICATIONS

International Application No. PCT/IB2016/055669, International Preliminary Report on Patentability, dated Sep. 13, 2017.

\* cited by examiner

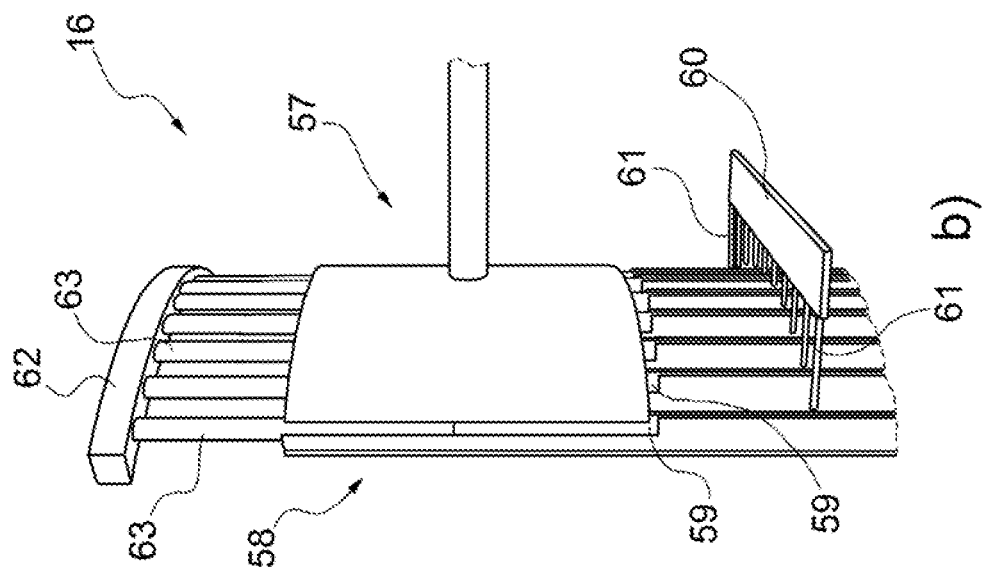
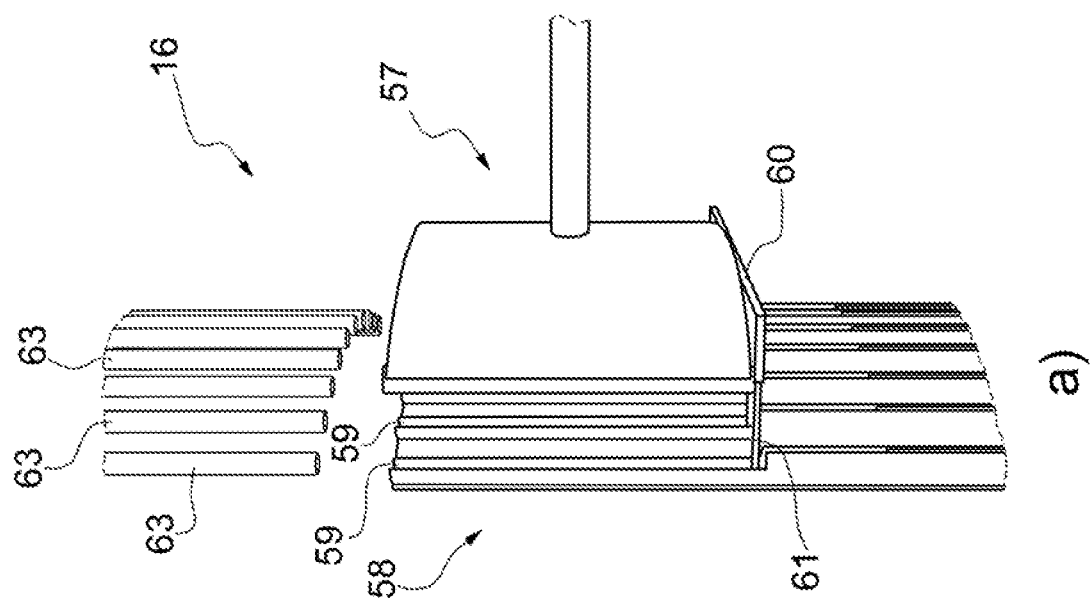
FIG.11

_US 10,889,394 B2_

MACHINE TO MANUFACTURE CARTRIDGES FOR ELECTRONIC CIGARETTES AND PLANT FOR THE PRODUCTION OF PACKAGES CONTAINING SAID CARTRIDGES FOR ELECTRONIC CIGARETTES

CROSS-REFERENCE TO RELATED APPLICATIONS

This is the U.S. national phase of International Application No. PCT/IB2016/055669, filed Sep. 22, 2016, which claims the benefit of Italian Patent Application No. 102015000053749, filed Sep. 22, 2015.

TECHNICAL FIELD

The present invention relates to a machine to manufacture cartridges for electronic cigarettes and to a plant for the production of packages containing said cartridges for electronic cigarettes.

PRIOR ART

Recently single-use (i.e. disposable) cartridges for electronic cigarettes have been proposed, comprising a tubular shaped casing made of plastic material with a microperforated bottom wall containing a quantity of powdered tobacco on top of which a portion of filtering material is arranged; and is closed at an upper end with a sealing ring.

The manufacturing of said cartridges provides for the filling of casings with a measured quantity of powdered tobacco, slightly compressing the mass of powdered tobacco inside each casing for obtaining the desired density and then capping the cartridges by applying to the upper open end both the portion of filtering material and the sealing ring. The cartridges are then weighed individually in order to allow the discarding of those that do not conform which are containing an insufficient or excessive quantity of powdered tobacco inside them.

Once the manufacturing of the cartridges is completed, the latter are inserted into packages, typically in blister packs, which comprise one electronic cigarette, and a plurality of said disposable cartridges.

Currently both the production of the blister packs and the manufacturing of the cartridges contained inside said packages is performed mostly manually or with rudimentary packaging machines which provide a continuous use of labour; consequently, the manufacturing of the cartridges and the production of the blister packs takes place in a slow manner (that is, with a low productivity) and with very variable level of quality (being generally modest).

DESCRIPTION OF THE INVENTION

The object of the present invention is to provide a machine to manufacture cartridges for electronic cigarettes and a plant for the production of packages containing said cartridges for electronic cigarettes, which machine and plant allow to achieve high productivity, high quality standards and are, at the same time, easy and inexpensive to produce.

According to the present invention, a machine to manufacture cartridges for electronic cigarettes and a plant for the production of packages containing said cartridges for electronic cigarettes are provided, as claimed in the attached claims.

BRIEF DESCRIPTION OF THE DRAWINGS

The present invention will now be described with reference to the accompanying drawings, which illustrate a non-limiting embodiment, wherein:

Figures from 1a to 1d are perspective views of a blister pack containing an electronic cigarette and three cartridges manufactured according to the present invention and, respectively, a perspective view from the top of the extended and folded configuration and a perspective view from below of the extended and folded configuration;

FIGS. 11a and 11b are perspective and side elevation views of a panel of the units for feeding filters of FIG. 10 in two different operating configurations;

PREFERRED EMBODIMENTS OF THE INVENTION

Figure 1:
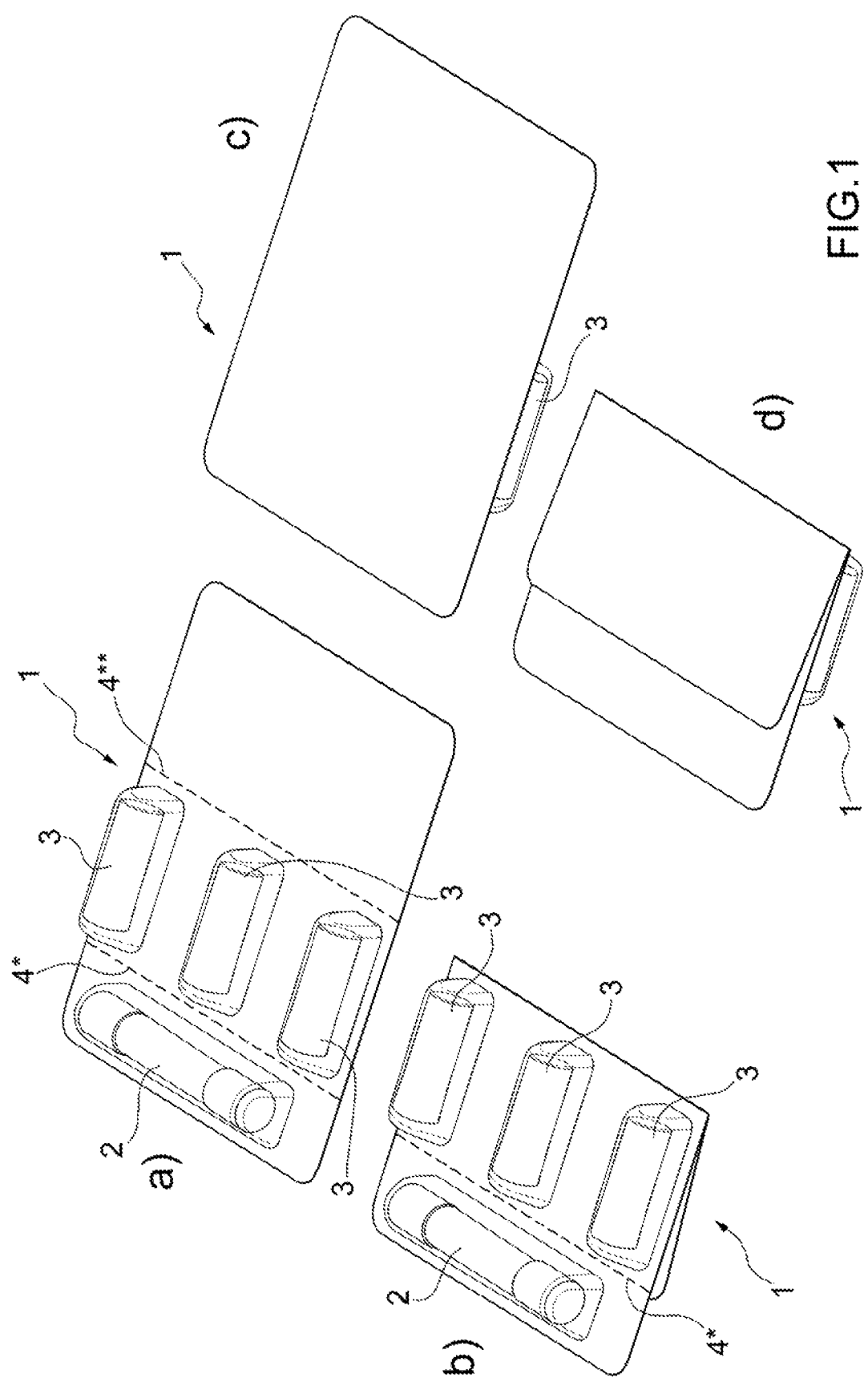

In FIG. 1 numeral 1 indicates as a whole a package containing one electronic cigarette 2 and a number of disposable cartridges 3, in particular, three cartridges 3. The package 1 is designed as a blister pack of a substantially rectangular shape in plan view, formed by moulding a plastic material in a pre-configured matrix provided with multiple separate pockets to house the electronic cigarette 2 and the single cartridges 3 and closed by means of a support layer (typically made of metallic material). The blister pack 1 has two pre-cut lines 4*, 4** parallel to the shorter side of the blister pack 1 itself, defining three portions of the blister pack 1; of which a first end portion where the electronic cigarette 2 can be housed in a direction parallel to the two pre-cut lines 4*, 4**; a central portion which houses three cartridges 3 arranged transversely to the two pre-cut lines 4*, 4 and an end portion which can be folded along the pre-cut line 4, and overturned by 180° (as illustrated in FIGS. 1b and 1d).

Each cartridge 3 comprises a casing 5 made of plastic material, designed as a containing tubular body 5 having a microperforated bottom wall 6 and a side wall 7 of a substantially cylindrical shape; inside the casing 5 a quantity of powdered tobacco is contained on top of which a portion 8 of filtering material is arranged; to a top end of the casing 5 a closing ring nut 9 is coupled.

Figure 2:
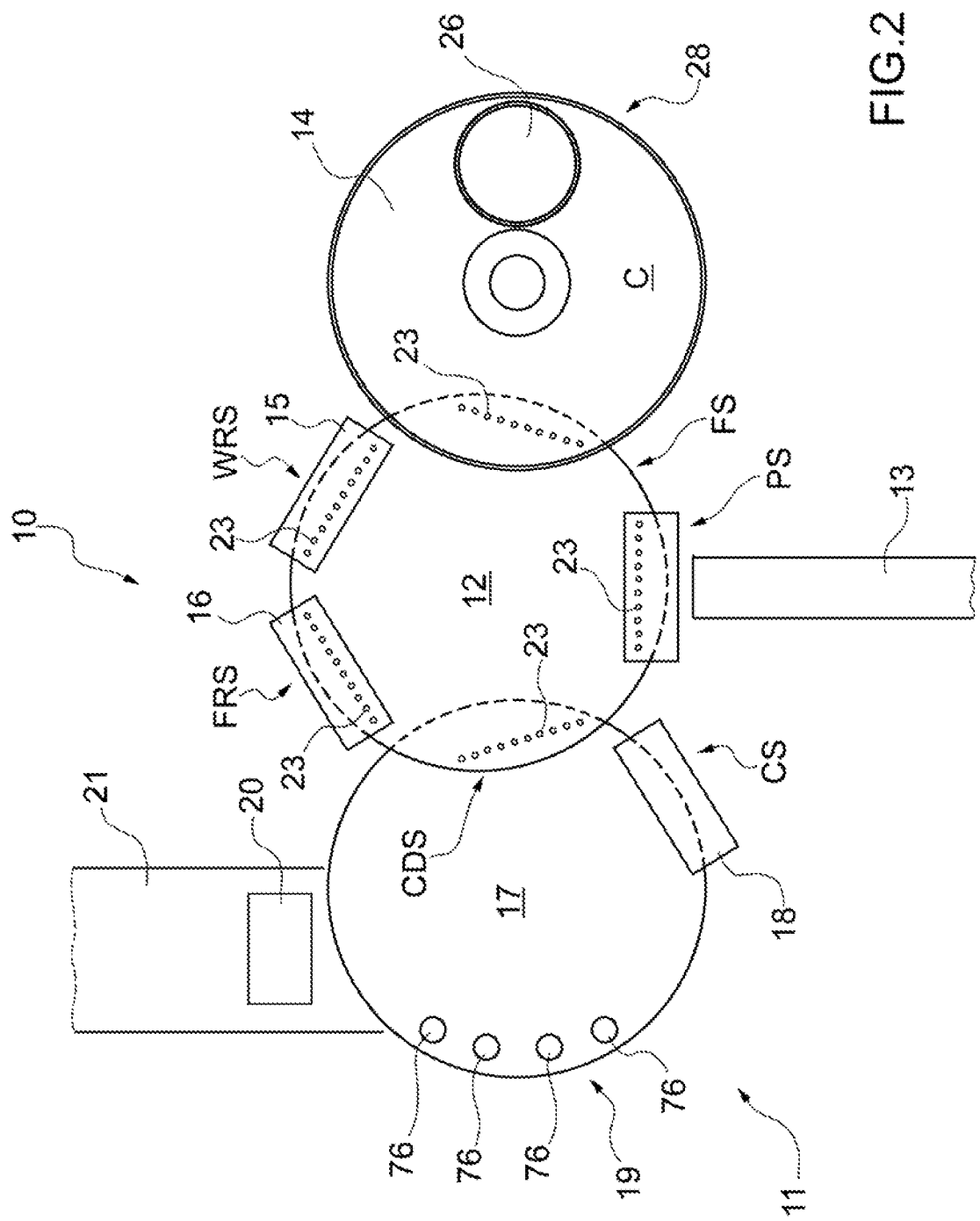
FIG. 2 illustrates a machine to manufacture the cartridges of FIG. 1.

In FIG. 2, number 10 denotes as a whole a plant for the production of blister packs 1 containing one electronic cigarette 2 and three cartridges 3, which in turn comprises a machine 11 to manufacture the cartridges 3.

As illustrated in FIG. 2, the machine 11 to manufacture the cartridges 3 comprises a drum 12 which is rotating at a predetermined pitch around its own vertical rotation axis and which receives an orderly mass of casings 5 (i.e. a mass of casings 5 aligned on a belt conveyor 13), a unit 14 for filling the casings 5 with powdered tobacco, a unit 15 for weighing the cartridges 3 containing powdered tobacco and for the possible discarding of the cartridges 3 which do not conform and a unit 16 for feeding portions 8 of filtering material arranged in succession along the periphery of the drum 12. The machine 11 to manufacture the cartridges 3 then comprises a further drum 17 rotating at a predetermined pitch around its own vertical rotation axis and provided with a unit 18 for feeding the closing ring nuts 9 and with a station 19 for welding said closing ring nuts 9 arranged in succession along the periphery of the drum 17. The belt conveyor 13 delivers the empty casings 5, in correspondence to a collecting station PS, to the drum 12 which feeds them to a filling station FS in which a quantity of powdered tobacco is inserted inside the casing 5 in correspondence to the filling unit 14. Subsequently, the cartridges 3 are fed by the drum 12 to a weighing and discarding station WRS in correspondence to the units 15 for weighing and discarding and to a station FRS for feeding the portions 8 in correspondence to the feeding unit 16 where a portion 8 of filtering material is inserted inside of each cartridge 3. The semi-finished cartridges 3 are then transferred from the drum 12 to the drum 17 in correspondence to a loading/unloading station CDS. The drum 17 in turn feeds the semi-finished cartridges to a station for applying the closing ring nuts 9 in correspondence to the feeding unit 18 and subsequently to the welding station 19.

Figure 14:
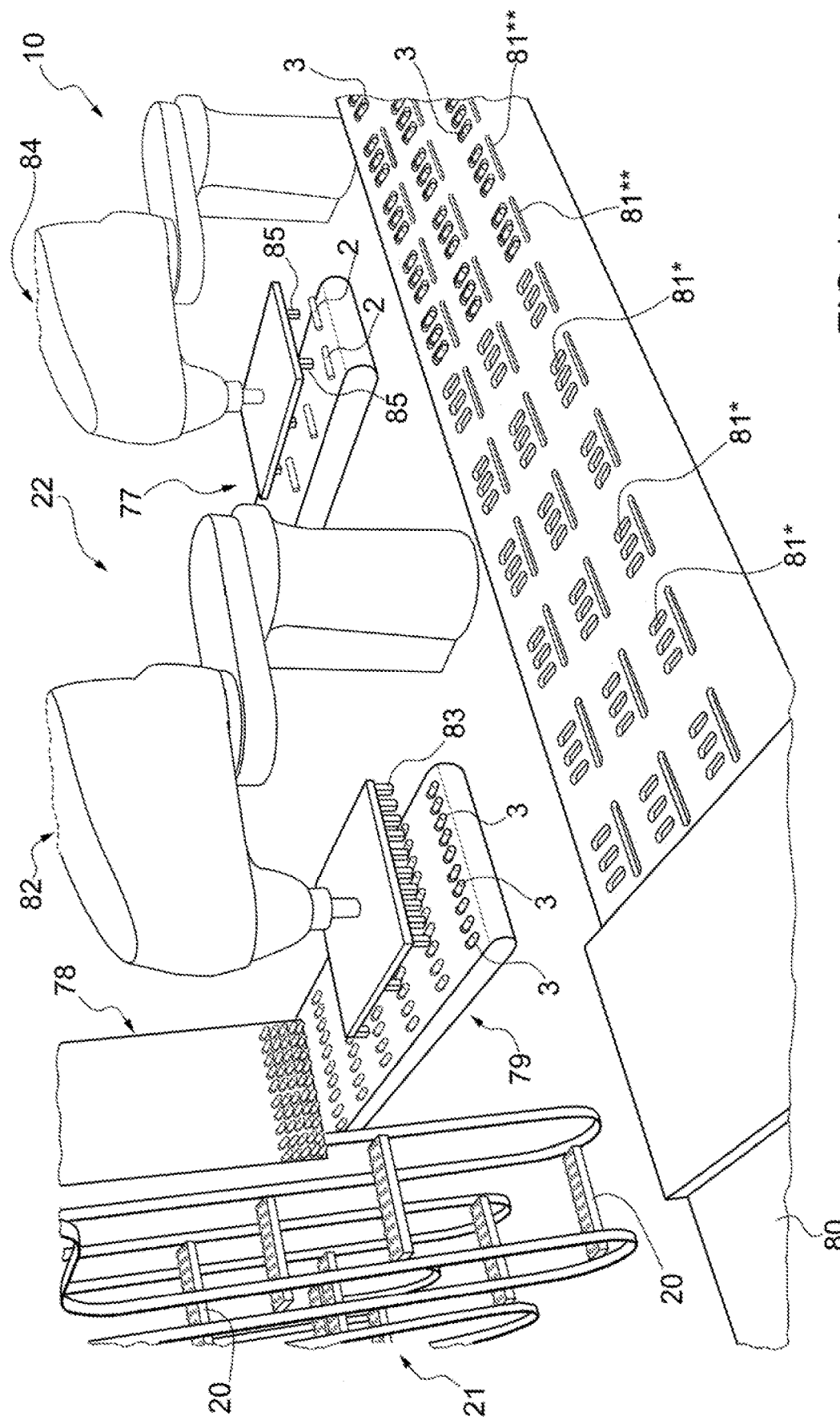
FIG. 14 is a perspective view of a section of a line for the production of the packages of FIG. 1.
Figure 15:
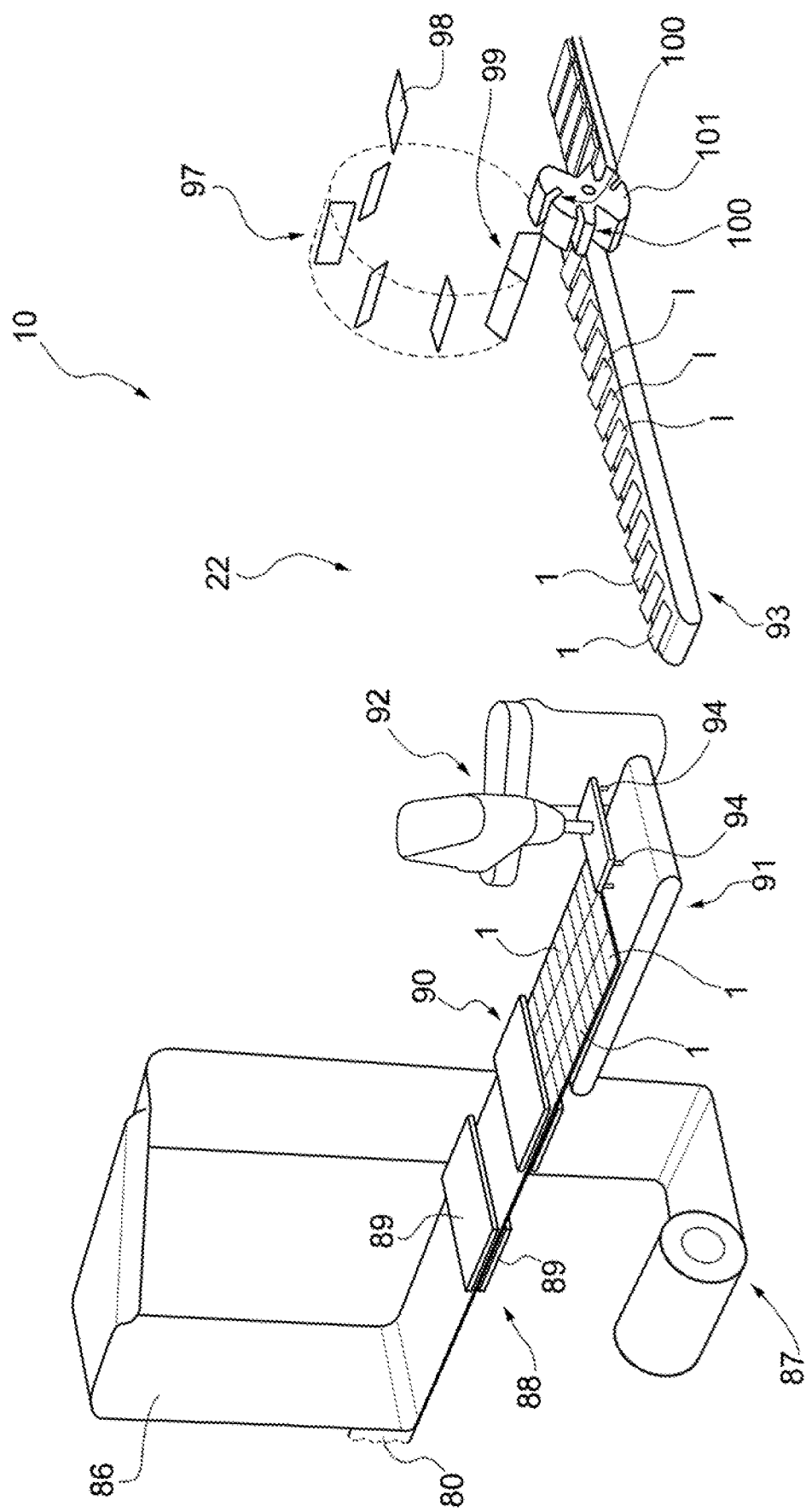
FIG. 15 is a perspective view of a further section of the line for the production of the packages of FIG. 1.

The drum 17 delivers the cartridges 3 exiting from the machine to a U-shaped conveyor (not illustrated) which first overturns the single cartridges 3 (i.e. reverses the orientation) and then feeds them inside of trays 20 (illustrated in FIG. 14) which are transported by a conveyor to a machine 22 for packaging the blister packs 1 (illustrated in FIGS. 14 and 15). The trays 20 have a plurality of substantially cylindrical seats, each of which is adapted to receive and house a corresponding cartridge 3; the seats which are typically divided into several rows oriented perpendicularly to the path of the conveyor 21 which receives an orderly mass of trays containing the same number of cartridges 3.

The drum 12 is brought into rotation with an intermittent motion, i.e. a non continuous motion which provides a cyclic alternation of motion steps, in which the drum 12 is in motion, and holding steps, in which the drum 12 stops. The drum 12 is provided with a number of seats 23 obtained on the periphery of the drum 12 itself and which are divided into groups; each group has a number of seats 23 arranged substantially in line (so as to define, in plan view, a polygon on the surface of the drum 12). As illustrated in FIG. 2, each group has ten seats 23 arranged substantially in line.

The subsequent steps of the manufacturing process of the cartridges 3 (such as for example the filling with powdered tobacco, weighing, the insertion of the portion 8 of filtering material, the coupling with the closing ring nut 9 and the subsequent sealing) contained in the seats 23 of a same group are performed in parallel, i.e. take place simultaneously for all the cartridges 3.

Figure 3:
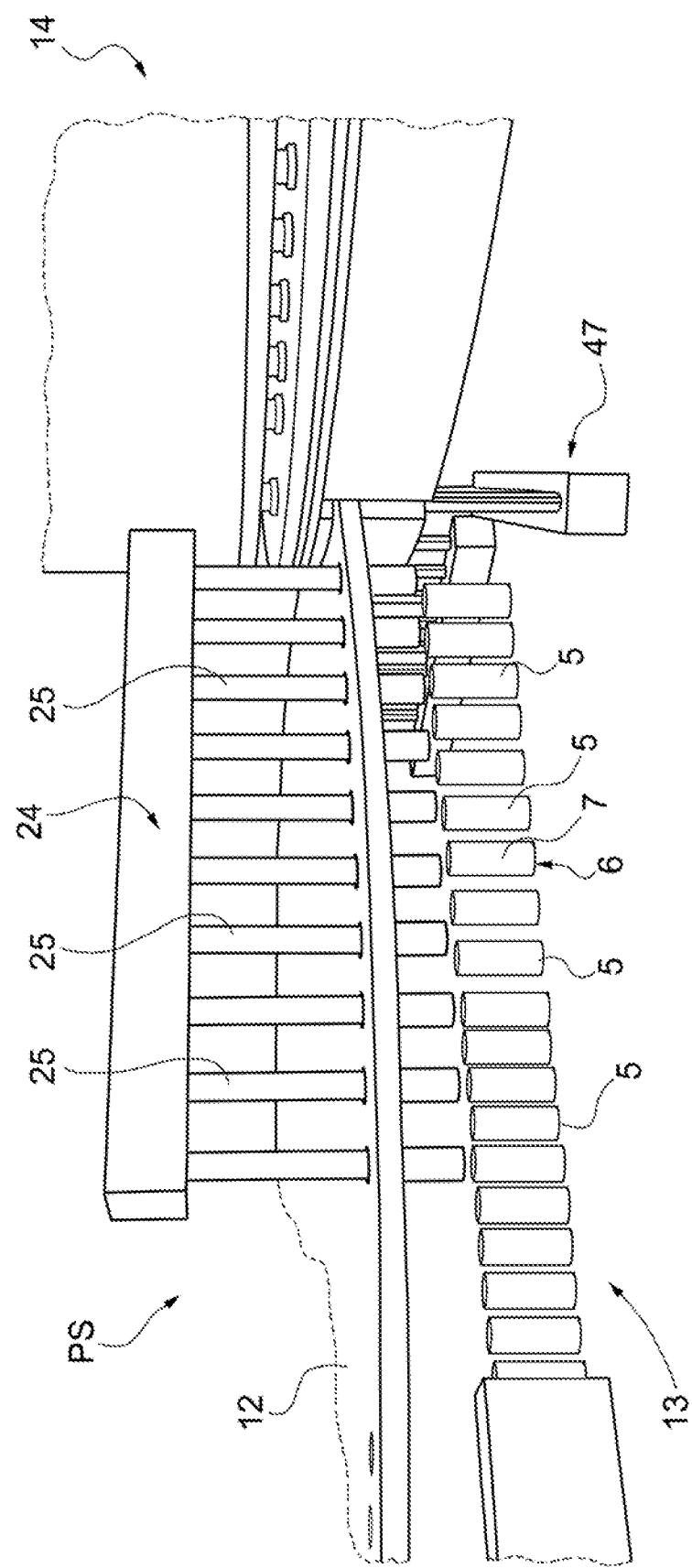
FIG. 3 is a perspective view of station of the machine of FIG. 2 for collecting the casings of the cartridges.

As illustrated in FIG. 3, the continuous mass of empty casings 5 aligned on the belt conveyor 13 coming from a store (not illustrated) is fed in correspondence to the collecting station PS which provides an arm 24 having a plurality of sucking members 25 equal to the number of the seats 23 of each group, that is, ten sucking members 25, and is arranged above the drum 12.

The arm 24 is vertically mobile between a lifted rest position and a forward collecting position, and vice versa. In the collecting position, each sucking member 25 is inserted into a respective seat 23 and faces a respective casing 5 which collects by sucking and then delivers in the correspondent seat 23 provided with jaws for holding an upper edge of the casing 5. Once the casings 5 are delivered in the seats 23, the arm interrupts the sucking and goes back to the lifted rest position.

The drum 12 is then fed, in an intermittent manner, with groups of ten empty casings 5 that from the collecting station PS are then transferred to the filling station FS arranged under the filling unit 14.

Figure 4:
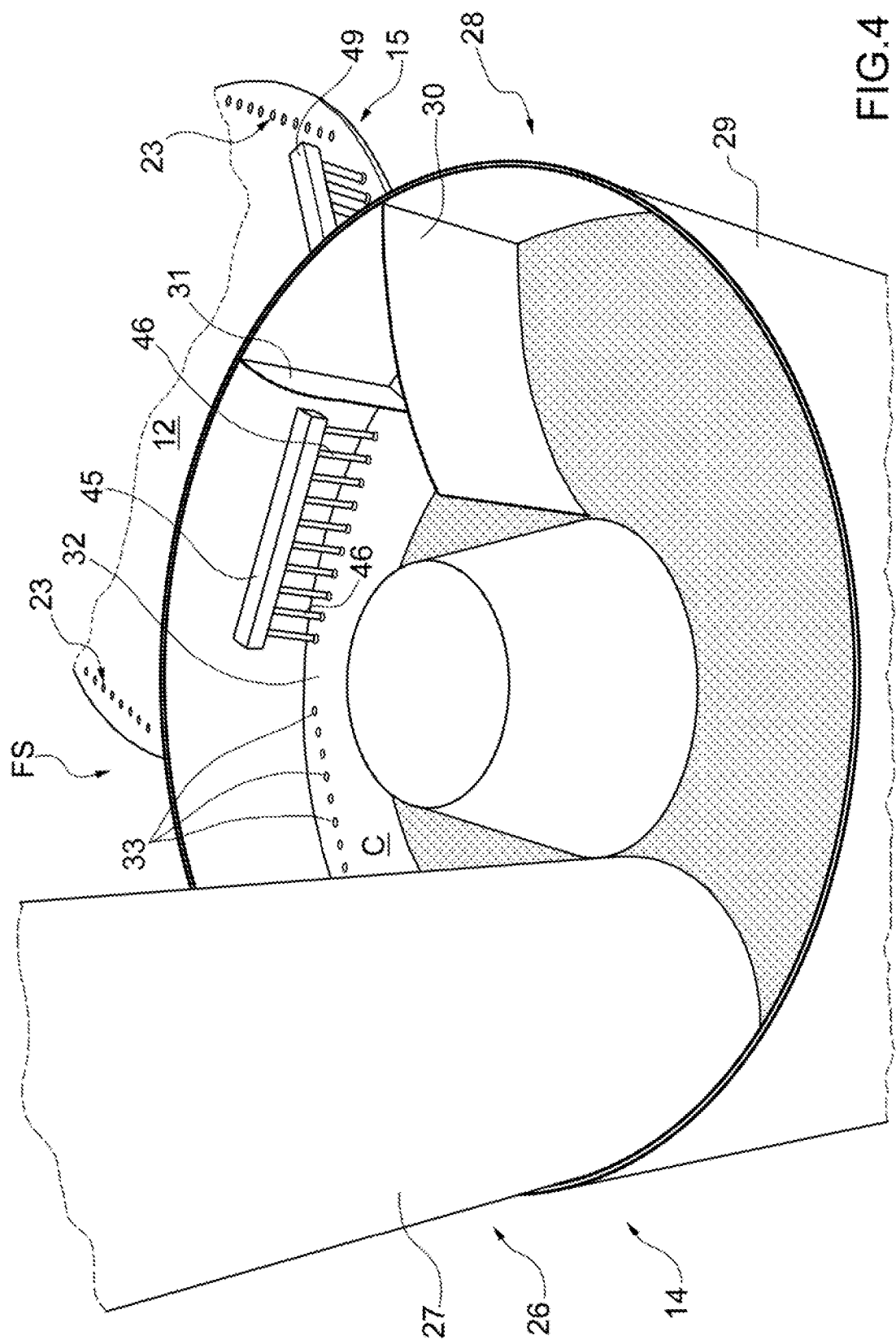
FIG. 4 is a perspective view from the top of a filling unit of the machine of FIG. 2.

As illustrated in FIG. 4, the filling unit 14 comprises a fixed upper hopper 26 made by means of a screw conveyor for the transport of powdered tobacco. The screw conveyor comprises a tubular outer liner 27 with a vertical axis provided, in correspondence to an upper end, with a loading mouth for the powdered tobacco which is then unloaded into a lower hopper 28.

In the lower hopper 28 an annular chamber C is obtained for collecting powdered tobacco delimited by a cylindrical side wall 29. An unload mouth of the upper hopper 26 is arranged in an area of the collecting chamber C diametrically opposite to an area of the collecting chamber C in which a pair of scraper elements are housed, respectively indicated with 30 and 31 and arranged in succession. In particular, a scraper element 30 is provided to obtain a rough scraping of the powder material; the scraper element 30 is connected to the cylindrical side wall 29 and is designed as a bulkhead of dimensions substantially equal to the width C of the collecting chamber. Downstream of the scraper element 30 a further scraper element is provided to obtain a fine scraping of the powder material; 31, the scraper element is fixed to the cylindrical side wall 29 and is designed as a bulkhead of smaller dimensions than the width C of the collecting chamber.

The filling unit 14 then comprises a plurality of discs arranged under the lower hopper 28 and designed to fill the empty casings 5 with the powdered tobacco which are brought into rotation at a predetermined pitch about a common vertical rotation axis.

In particular, a disc 32 defines the bottom wall of the collecting chamber C, is connected to the cylindrical side wall 29 and is provided with a number of through-holes 33 obtained on the periphery of the disc 32 itself, divided into groups; each group has a number of holes 33 arranged substantially in a line and equal to the number of seats 23 in each group, that is, ten holes 33.

Figure 5:
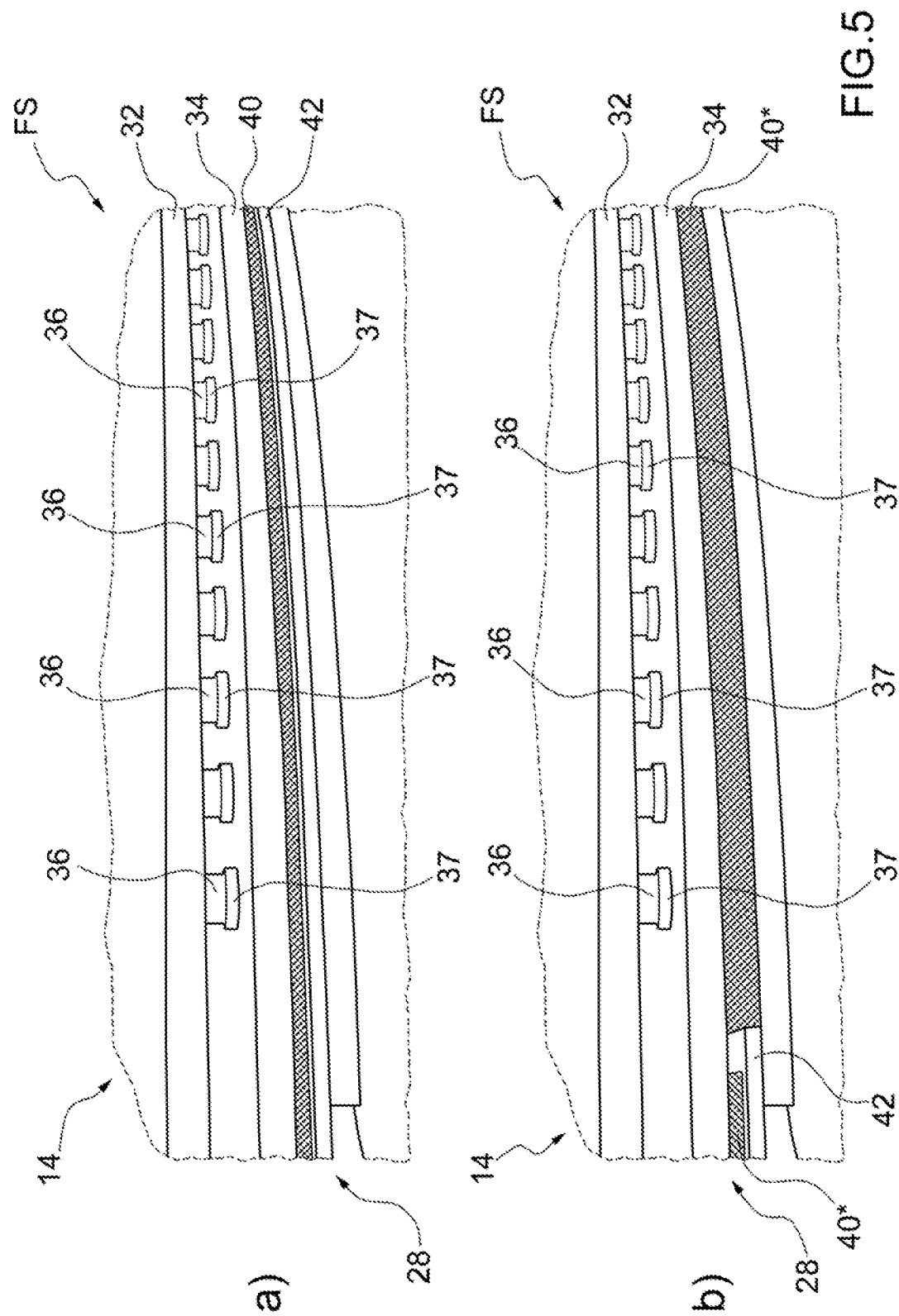
FIGS. 5a and 5b are perspective and side elevation views of a detail of the filling unit of the machine of FIG. 3 in two different positions.
Figure 6:
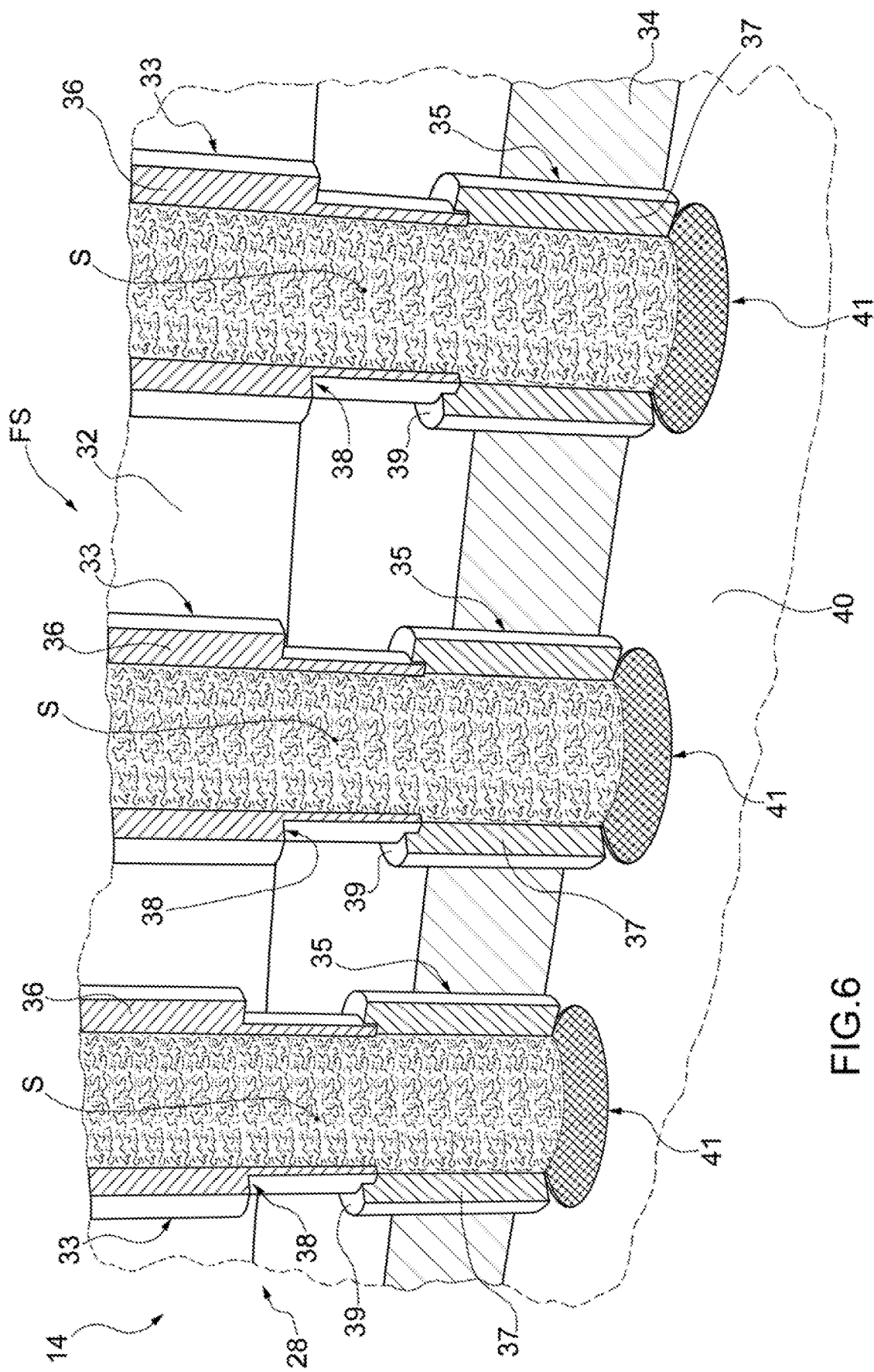
FIG. 6 is a view in section and with parts removed for clarity, of the detail of the filling unit of FIGS. 5a and 5b.

As better illustrated in FIGS. 5 and 6, under the disc 32 a further disc 34 is provided, which is also provided with a number of through-holes 35 obtained on the periphery of the disc 34 itself divided into groups; wherein each group has a number of holes 35 arranged substantially in a line and equal to the number of seats 23 in each group, that is, ten holes 33.

The holes 35 of the disc 34 are directly facing the holes 33 of the disc 32 so as to define by means of respective pairs of telescopic guides 36, 37 a plurality of compartments S to house a quantity of powdered tobacco. In particular, an upper guide element 36 is inserted into a hole 33 and cooperates with a respective lower guide element 37 housed inside the corresponding hole 35 to define a compartment S for collecting the powdered tobacco.

The two discs 32, 34 are mobile relative to one another in the vertical direction so as to vary the mutual distance and the volume of the single compartments S between a minimum volume in which a shoulder 38 of the upper guide element 36 strikes against an upper edge 39 of the lower guide element 37 (and the two discs 32, 34 are arranged as close to each other as possible) and a maximum volume in which the two discs 32, 34 are arranged as far from each other as possible, and vice versa.

According to a preferred alternative, the disc 32 is mobile in a vertical direction between the two end positions corresponding, respectively, to the minimum volume and to the maximum volume of the compartments S, and vice versa; while the disc 34 is fixed.

The volume of the single compartments S (that is, the relative distance between the two discs 32, 34) is determined in a preliminary step of the process to manufacture the cartridges 3 as a function of the weight and of the quantity of powdered tobacco to be inserted inside the casings 5.

The compartments S are filled with the powdered tobacco poured from the upper hopper 26 and the action of the two scraper elements 30, 31 arranged in series inside the collecting chamber C allows to uniform and level the quantity of powdered tobacco contained inside each compartment S.

Figure 8:
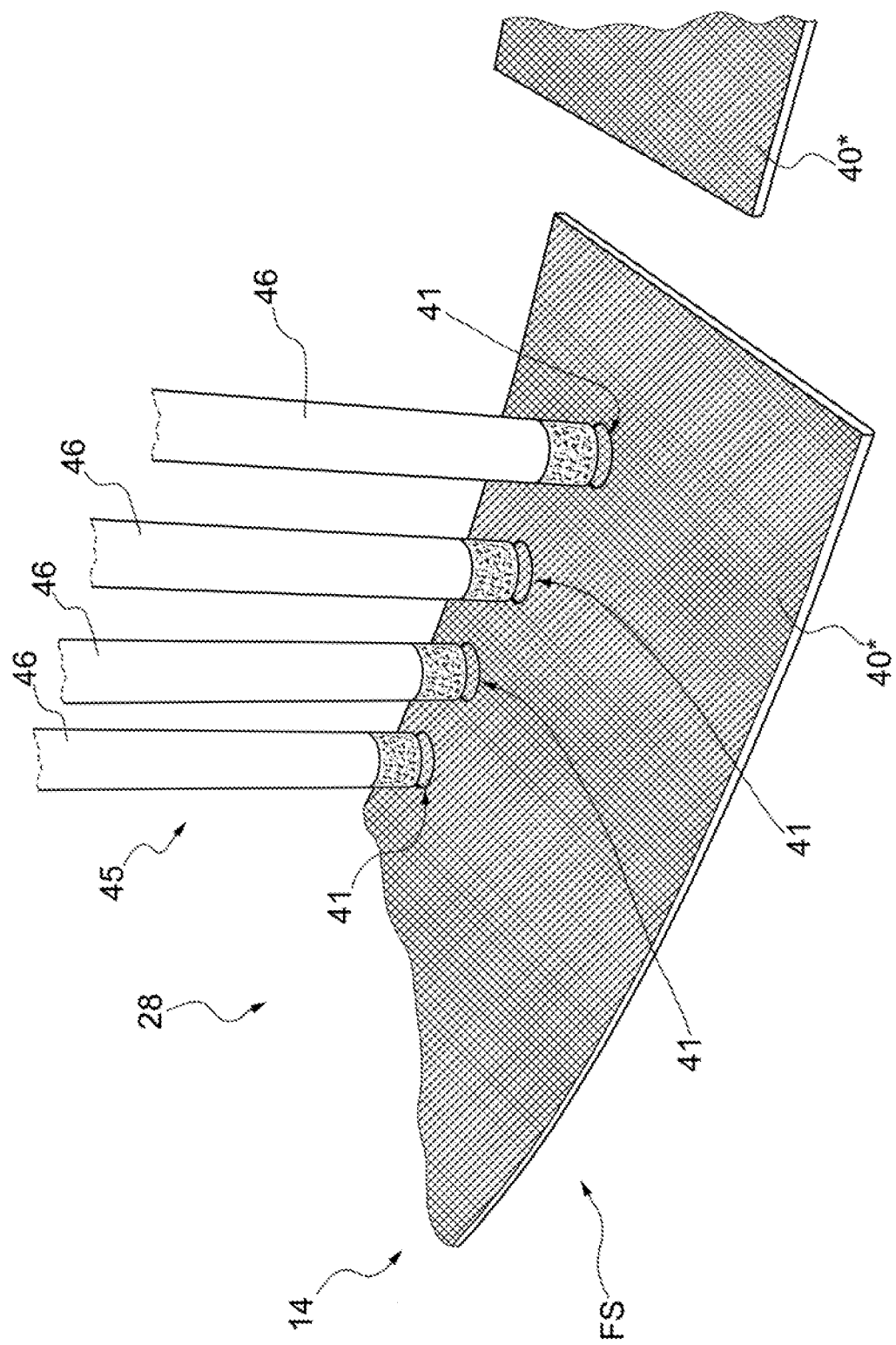
FIG. 8 is a perspective view with parts removed for clarity, of the filling station of FIG. 7.

As illustrated in FIGS. 5, 6 and 8, each compartment S is closed at the bottom by a further disc 40 arranged under the disc 34, designed as an annular element made of microperforated plastic material and divided into a plurality of sectors 40* each independent of the other. Each sector 40* is provided with a number of through-holes 41 obtained in the vicinity of an inner edge of the sector 40* itself arranged substantially in a line and equal to the number of seats 23 in each group, that is, ten holes 41.

Each sector 40* is mobile between two end positions, of which a forward position (illustrated in FIG. 5a) and a rear position (illustrated in FIG. 5b), and vice versa. In the forward position, the sector 40* defines a base wall of the single compartments S and an outer edge is substantially arranged flush with the outer surfaces of the cylindrical side wall 29 and of the two discs 32, 34.

From the forward position the sector 40* is controlled to retract and protrude towards the outside of the filling unit 14 until being arranged in the rear position, in which each hole 41 is arranged in a position facing a respective hole 35. In other words, each hole 45 is arranged exactly in correspondence to a respective compartment S.

Figure 7:
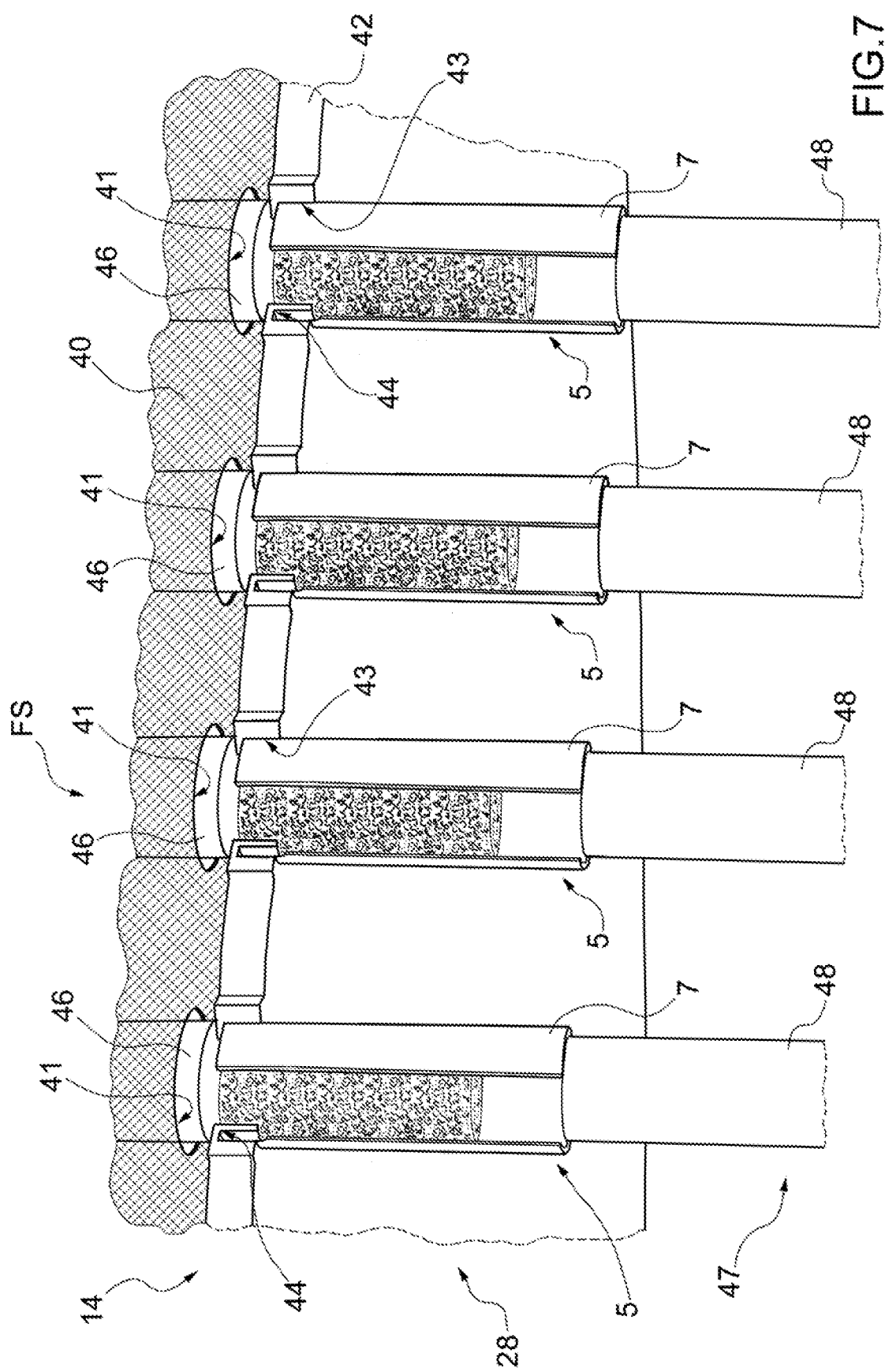
FIG. 7 is a view partly in section and with parts removed for clarity, of a filling station of the filling unit of FIG. 4.

Finally, as illustrated in FIG. 7, the filling unit 14 comprises a further disc 42 arranged under the disc 40 and provided with a number of through-openings 43 obtained in the vicinity of the outer edge of the disc 43 itself and which are divided into groups; in which each group has a number of openings 43 arranged substantially in a line and equal to the number of seats 23 in each group, that is, ten openings 43.

In particular, the openings 43 are arranged exactly in correspondence to a respective compartment S with the interposition of a sector 40*. The openings 43 are defined by a U-shaped annular edge with a cavity 44 facing downwards. The U-shaped cavity 44 acts as a guide for the upper edge of the casing 5 so as to considerably reduce overflow and deposits of powdered tobacco.

Next to the scraper element 31 inside the collecting chamber C, an arm 45 is housed provided with a plurality of pusher elements 46. In particular, the arm 45 has a number of pusher elements arranged substantially in a line and equal to the number of seats 23 in each group, that is, ten pushers elements 46. The arm 45 is mobile in a vertical direction between a lifted position and a forward operating position in which each pusher element 46 fits at least partially into a respective compartment S, and vice versa.

In correspondence to the filling station FS, an arm 47 is also provided (partially illustrated in FIG. 7 and in FIG. 3) which is arranged under the disc 42 and is provided with a plurality of support elements 48. In particular, the arm 47 has a number of support elements 48 arranged substantially in a line and equal to the number of seats 23 in each group, that is, ten support elements 48. In the filling station FS, the discs 32, 34, 40 and 42 are stopped in a position that allows each compartment S to be arranged in correspondence to a respective pusher element 46 and to a respective support element 48. The arm 47 is mobile in a vertical direction between a rest position and a lifted operating position, and vice versa.

In correspondence to the station FS for filling the casings 5 with the powdered tobacco the following steps occur in succession:

the drum 12 transports the empty casings 5 in correspondence to the filling station FS under the disc 42 and above the arm 47;

the jaws of the seats 23 release the respective casings 5, each of which is supported by a respective support element 48;

the arm 47 is actuated to move from the rest position to the lifted operating position; each support element 48 lifts the respective casing 5 until inserting the upper edge into the associated U-shaped guide 44;

the sector 40* moves from the forward position to the rear position so that each hole 41 is arranged in correspondence to the respective hole 35 and to the respective compartment S so as to allow the downward movement of the powdered tobacco contained in the compartment S toward the casing 5;

the arm 45 is lowered from the lifted position to the forward operating position so that each pusher element 46 fits into the respective compartment S; the movement of the arm 45 towards the forward operating position is divided into a first step in which the pusher elements 46 accompany the downward movement of the powdered tobacco inside the casings 5 and a second step in which, once the casings 5 are filled, the arm 45 accompanies the downward movement of the casings 5 which disengage the U-shaped guide 44;

once arrived in the forward operating position, the arm 45 moves back again, exits from the spaces S until returning to the lifted position;

simultaneously with the movement of the arm 45, also the arm 47 is actuated to move from the lifted operating position to the rest position in which it transfers the casings 5 containing the powdered tobacco in a respective seat 23 provided with jaws to hold them;

the sector 40* moves forward from the rear position until being arranged again in the forward position, so as to prevent communication between the compartments S and the openings 43;

the discs 32, 34, 40 and 42 of the filling unit 14 are finally brought into rotation while the drum 12 transfers the casings 5 containing powdered tobacco to the next weighing and discarding station WRS.

It should be pointed out that the movement of the arm 45 which accompanies the downward movement of the casings 5 containing the powdered tobacco also allows to slightly compress the mass of powdered tobacco until the desired density is obtained.

Figure 9:
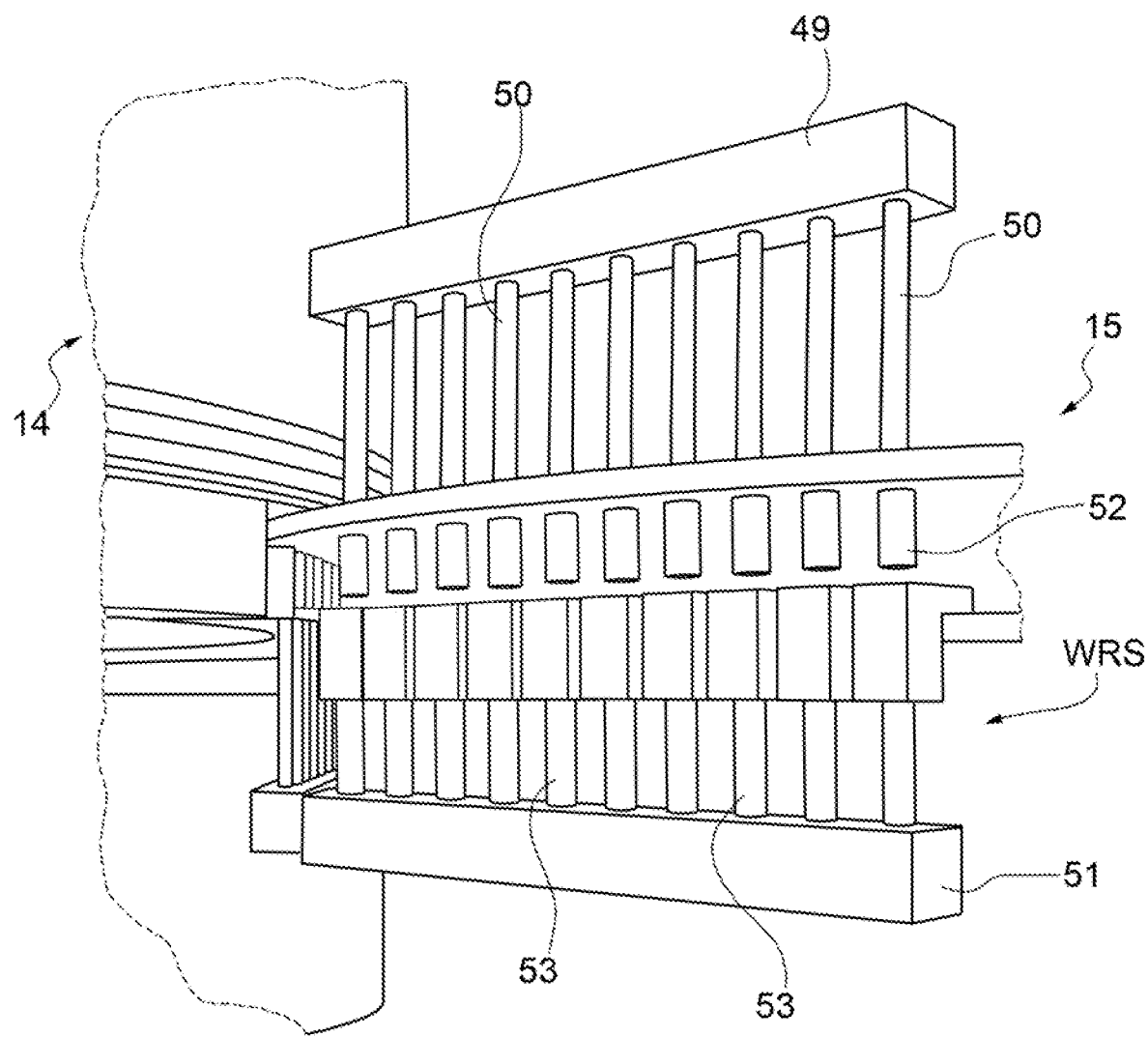
FIG. 9 is a perspective view of a station of the machine of FIG. 2 for weighing and discarding the cartridges.

As illustrated in FIG. 9, the weighing and discarding unit 15 comprises an upper arm 49 arranged above the drum 12 and provided with a number of pusher elements 50 arranged substantially in a line and equal to the number of seats 23 in each group, that is, ten pusher elements 50. The arm 49 is mobile in a vertical direction between a lifted position and a forward operating position, and vice versa. The weighing and discarding unit 15 also comprises a lower arm 51 arranged under the drum 12 and a weighing device 52 and provided with a number of support elements 53 arranged substantially in a line and equal to the number of seats 23 in each group, that is, ten support elements 53. Also the arm 51 is mobile in a vertical direction between a rear resting position and a lifted operating position, and vice versa. The arm 51 cooperates with the arm 49 to perform the weighing and discarding of the single cartridges 3. The weighing device 52 comprises ten scales with load cells, each adapted to perform the weighing of the respective cartridge 3.

The drum 12 transports the cartridges in correspondence to the weighing and discarding station WRS; the arm 51 is actuated to move from the rear resting position to the operative lifted position, so that each support element 53 is arranged in correspondence to a respective cartridge 3 which are then released by the jaws of the seats 23. The arm 49 is lowered so that each pusher element 50 is inserted into a respective seat 23 and accompany the movement of the cartridge 3 towards the weighing device 52; at the same time, also the arm 51 is actuated to move from the lifted position to the withdrawn rest position.

The weight of each cartridge 3 is detected by means of a respective load cell and stored in a control unit of the packaging plant 10. In the case in which the weight of the cartridge 3 does not fall within a range of acceptable values, said cartridge 3 is immediately discarded. Furthermore, the control unit is configured to calculate the average weight of the cartridges 3 detected by the different load cells and report any deviations between the average values determined for the various load cells.

Once the weighing of the single cartridges 3 is performed, the arm 49 moves back again, exits from the seats 23 until returning to the lifted position while the arm 51 is moved again towards the lifted operating position to transfer each cartridge 3 in a respective seat 23 provided with jaws to hold it; the drum 12 is rotated for transferring the cartridges 3 to the station FRS for feeding portions 8 of filter.

Figure 10:
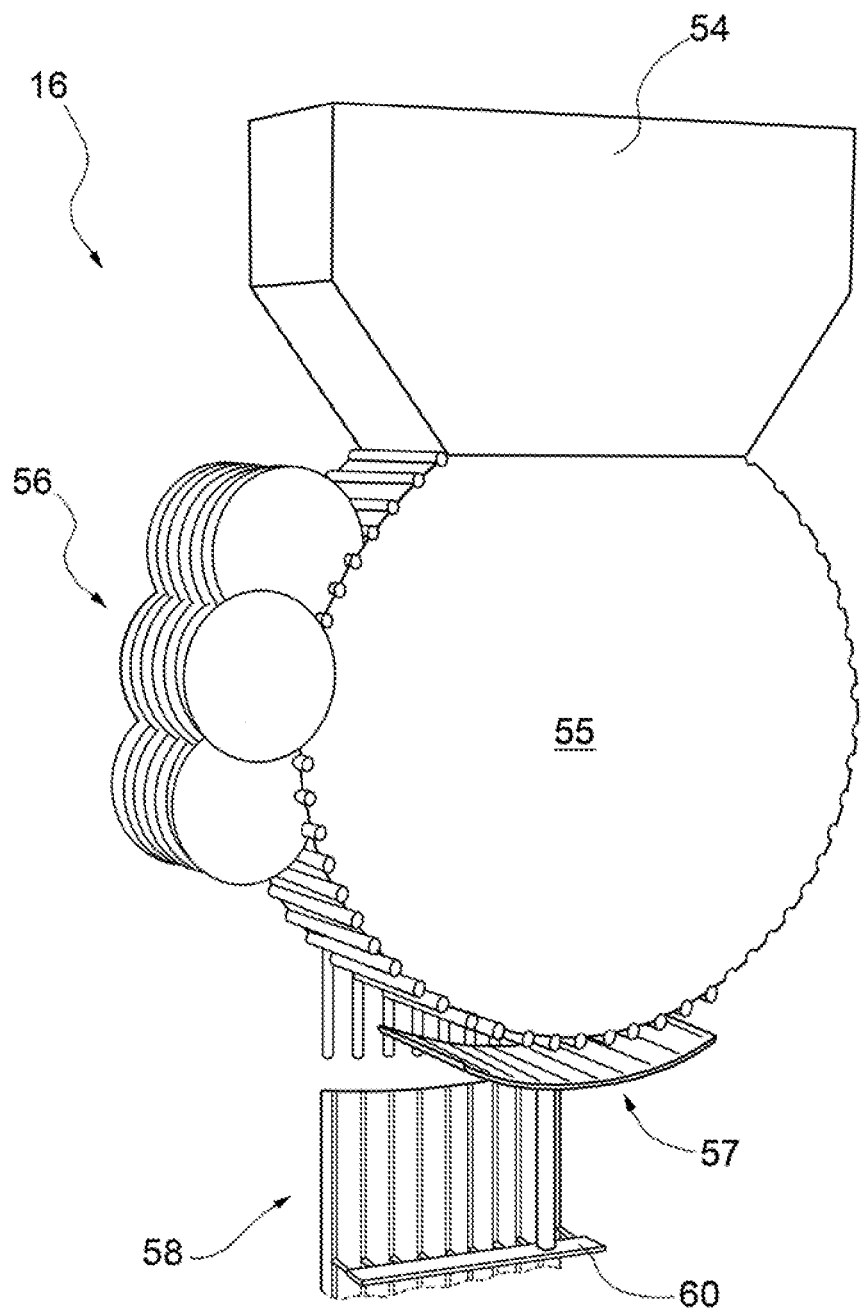
FIG. 10 is a perspective view of a unit for feeding filters of the machine of FIG. 2.

As illustrated in FIG. 10, the unit 16 for feeding portions 8 of filter comprises an upper hopper 54 housing a disorderly mass of multiple-length rods of filtering material; and a collecting drum 55, which collects the multiple-length rods of filtering material, one after the other, from the bottom of the hopper 54, is provided with a plurality of sucking seats to hold the multiple-length rods of filtering material and cooperates with a cutting device 56 provided with blades to perform a transverse cut of the multiple-length rods of filtering material so as to obtain portions 8 of filtering material of desired length.

The unit 16 for feeding filters then comprises a panel 57 which receives the rods of filtering material divided into portions 8 of desired length by the collecting drum 56. In particular, the panel 57 is provided with a number of sucking seats to hold the rods of filtering material divided into portions 8 of desired length; in which the number of sucking seats is equal to the number of seats 23 in each group, that is, ten sucking seats.

The panel 57 is mobile between a collecting position (illustrated in FIG. 10) in which the axes of the portions 8 of filtering material are horizontal and a releasing position (illustrated in FIGS. 11a and 11b) in which, instead, the axes of the portions 8 of filtering material are vertical.

The panel 27 completes a 90° rotation from the collecting position to the releasing position and moves in the horizontal direction until being arranged in a position directly facing a store 28 for collecting portions 8 of filtering material; the suction of the sucking seats is then interrupted so that the panel 27 can release the stacks of portions 8 of filtering material inside respective channels 59 of the store 58.

The store 58 is in fact divided into a number of channels 59 which is also equal to the number of seats 23 in each group, that is, ten channels 29, each of which is arranged to house the portions 8 of filtering material released by a corresponding sucking seat. Under the panel 57 a comb element 60 is provided being mobile both in the horizontal direction and in the vertical direction and provided with a plurality of teeth 61 each inserted into a respective channel 59 for holding the stack of portions 8 of filtering material released by a corresponding sucking seat. In particular, the comb element 60 is mobile in a horizontal direction between a rear position and a forward position in which the end of each tooth 61 engages a respective channel 59; from the forward position, the comb element 60 is able to move downward in the vertical direction along the channels 59 and to stop immediately above the stacks of portions 8 of filtering material already contained in the channels 59.

Furthermore, above the panel 57 a pusher element 62 is also provided, being mobile in a vertical direction and also provided with a plurality of elements 63 designed to fit into a respective channel 59 and accompany the downward movement of the portions 8 of filtering material inside the respective channel 59.

In use, when the panel 57 releases the stacks of portions 8 of filtering material inside the channels 59, the comb element 60 is in the forward position so that the tip of each tooth 61 acts as a support for a respective stack of portions 8 of filtering material. The comb element 60 is then lowered to allow the simultaneous lowering of the stacks of portions 8 of filtering material inside the respective channels 59. At the same time, the pusher element 62 is lowered so that each element 63 is inserted into the respective channel 59 to facilitate the downward movement of the stack of portions 8 of filtering material inside the channel 59.

The comb element 60 is stopped immediately above the stacks of portions 8 of filtering material already contained in the channels 59, and is subsequently extracted from the store 58 so that the portions 8 of filtering material just introduced can be arranged on top of the portions 8 of filtering material already contained in channels 59.

Figure 12:
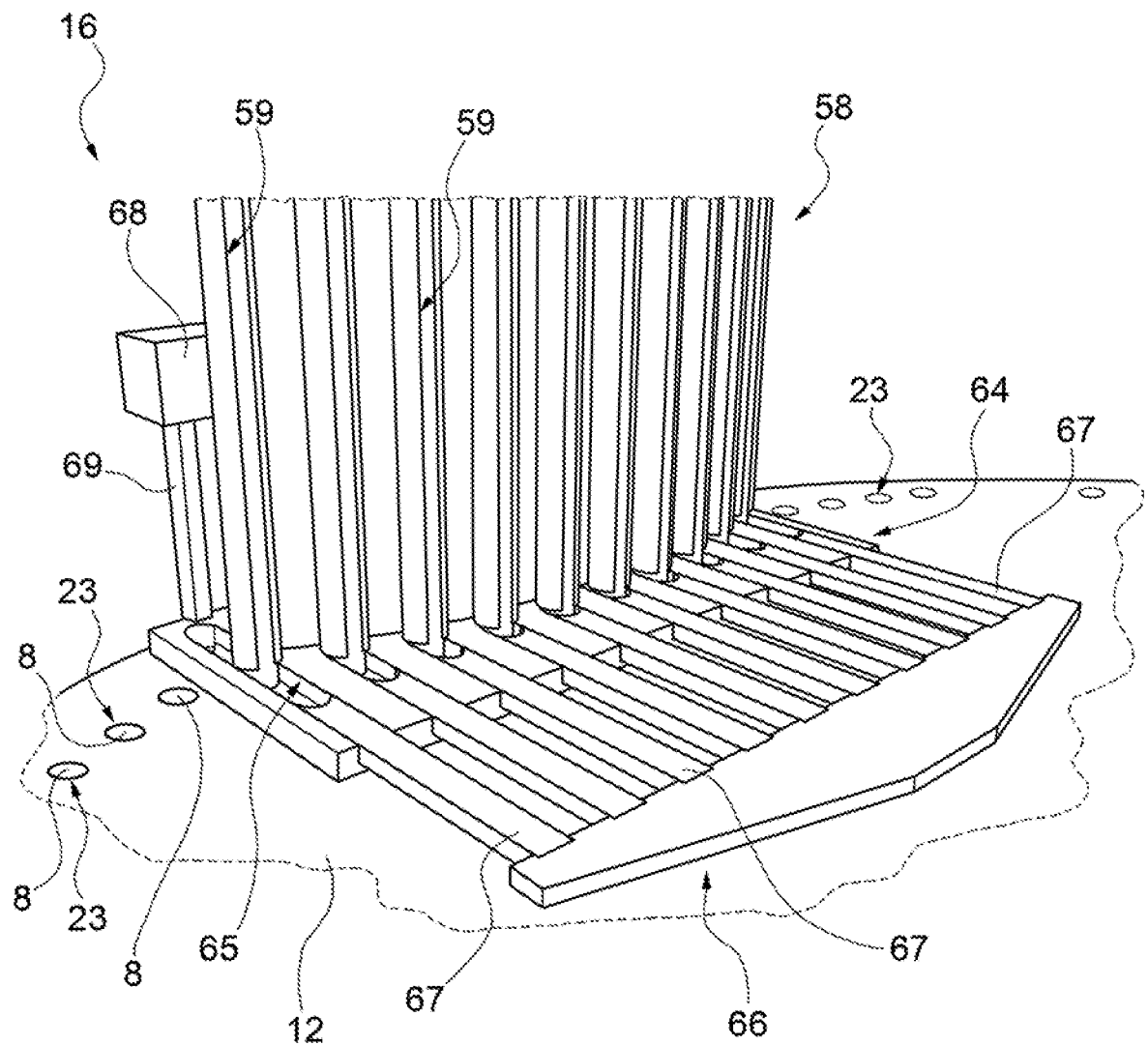
FIG. 12 is a perspective view of a detail of the unit for feeding filters of FIG. 10.

As illustrated in FIG. 12, the unit 16 for feeding filters further comprises a lower guide 64 associated with the store and provided with a plurality of grooves 65 which cooperates with an arm 66 being mobile in a horizontal direction and also provided with a plurality of elements 67 designed to fit into and slide inside a respective groove 65 and to accompany the movement of a single portion 8 of filtering material towards the end of the respective groove 65. The lower guide 64 comprises a number of grooves 65 which is equal to the number of seats 23 of each group, that is, ten grooves 65.

Finally, the unit 16 for feeding filters comprises an inserting arm 68 arranged in the back of the store 58 and mobile in a vertical direction. Also the inserting arm 68 is provided with a plurality of elements 69 designed to insert a respective portion 8 of filtering material into a cartridge 3. The arm 68 comprises a number of elements 69 which is equal to the number of seats 23 of each group, that is, ten elements 69.

In use, the drum 12 transports the cartridges 3 in correspondence to the station for feeding the portions 8 of filtering material so that each cartridge 3 (that is, each seat 23 of the drum 12 which conveys the cartridges 3) is arranged into a position facing and exactly in correspondence to the bottom of a respective groove 65. The portion 8 of filtering material it is then conveyed by the respective element 67 and the insertion inside the respective cartridge 3 is performed by means of the element 69 which, by lowering pushes the portion 8 of filtering material inside the cartridge 3.

According to a preferred alternative, the portions 8 of the filtering material are already wrapped with a wrapper; the elements 67 and the elements 69 are shaped so as to avoid an excessive compression of the portions 8 of filtering material which could cause the slipping off of the outer wrapper. In particular, the elements 69 (or at least their ends in contact with the portions 8 of filtering material) have recesses obtained on the outer surface or, alternatively or in addition, are made as tubular bodies having, however, a smaller diameter with respect to the diameter of the portions 8 of filtering material.

The drum 12 subsequently transfers the cartridges 3 to a loading and unloading station CDS in which the drum 12 partially overlaps the drum 17. The jaws of the seats 23 release the respective cartridges 3 that are received and held within respective peripheral seats 70 on the drum 17.

The drum 17 is provided with a number of seats 70 obtained on the periphery of the drum 17 itself and which are divided into groups; each group has a number of seats 70 arranged substantially in a line (so as to form, in plan view, a polygon on the surface of the drum 17) which is equal to the number of seats 23 of each group, that is ten seats 70.

Figure 13:
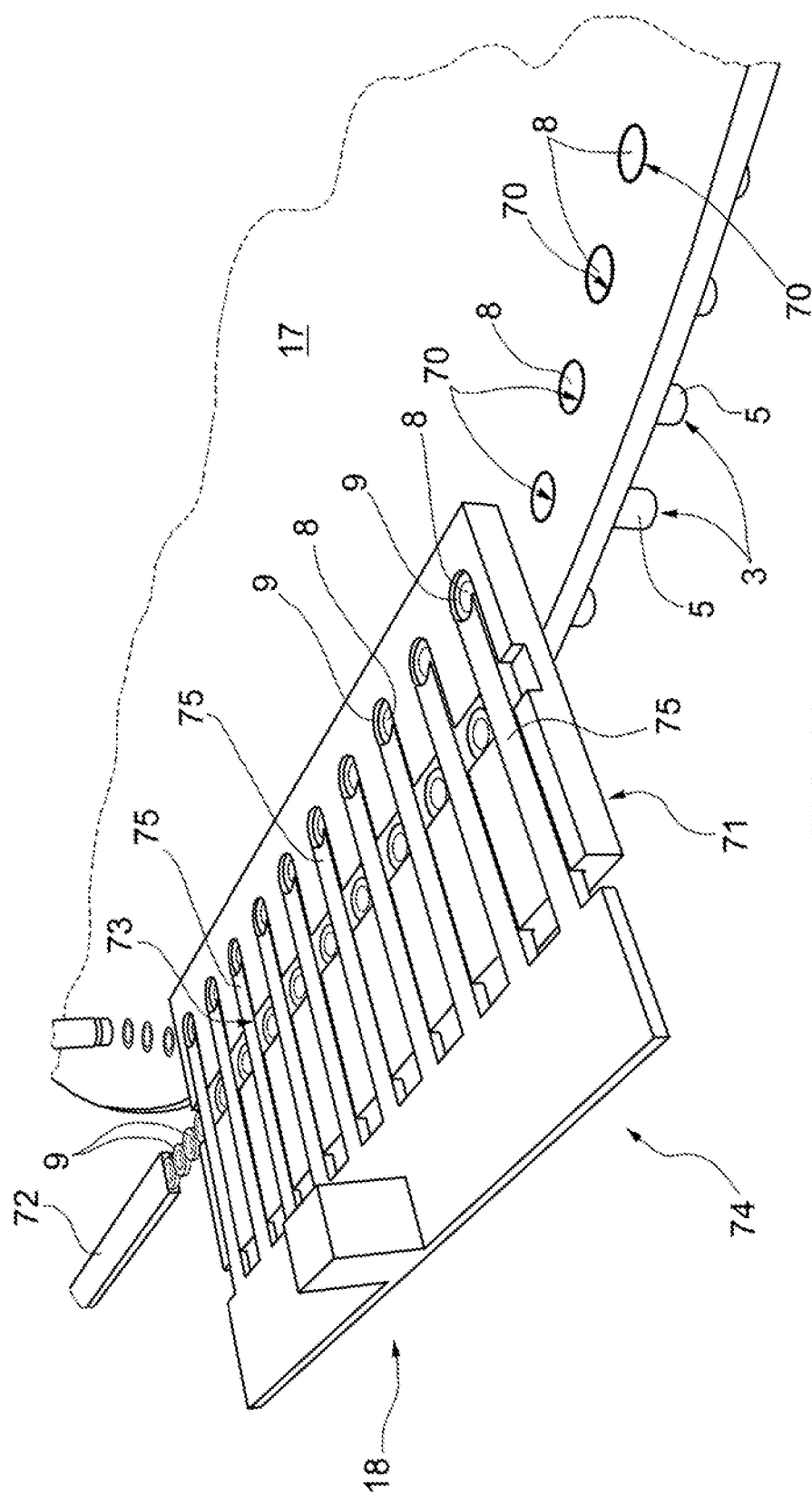
FIG. 13 is a perspective view of a station of the machine of FIG. 2 for feeding the closing ring nuts.

The cartridges 3 are then conveyed to a station CS for applying the closing ring nuts 9. As illustrated in FIG. 13, the unit 18 for feeding the closing ring nuts 9 comprises a guide 71 which receives a continuous and orderly mass of ring nuts 9 from a store (not illustrated) by means of a belt conveyor 72. The guide 71 is provided with a plurality of grooves 73 and cooperates with an arm 74 being mobile in a horizontal direction and provided with a plurality of pusher elements 75 designed to fit into and slide inside a respective groove 73 and to accompany the movement of a single closing ring nut 9 towards the bottom of the respective groove 73. Clearly, also the lower guide 71 comprises a number of grooves 73 which is equal to the number of seats 23 of each group, that is, ten grooves 73.

In correspondence to the station CS for applying the closing ring nuts 9, a lifting arm (not illustrated) it is also provided, being mobile in a vertical direction, which is arranged under the drum 17 and is provided with a plurality of support elements. In particular, the lifting arm has a number of support elements arranged substantially in a line and equal to the number of seats 23 in each group, that is, ten support elements, and substantially in correspondence to respective closed ends of the grooves 73.

In use, the drum 17 transports the cartridges 3 at the station CS for applying the closing ring nuts 9 so that each cartridge (that is, each seat 70 of the drum 17 which conveys the cartridges 3) is arranged exactly in correspondence to the closed end of a respective groove 73. The closing ring nut 9 is then conveyed by the respective pusher element 75 and the insertion inside the cartridge 3 is achieved by way of lifting the cartridge 3 performed by a respective support element of the lifting arm.

Finally, the drum 17 transfers the cartridges 3 to the station 19 for welding the closing ring nuts 9 onto the casings 5. The welding station 19 performs an ultrasonic welding and comprises a plurality of sonotrodes 76 (schematically illustrated in FIG. 2) arranged above the drum 17; each sonotrode 76 cooperates with a respective anvil which is arranged, instead, under the drum 17 for lifting the cartridge 3 towards the welding head of the sonotrode 77 itself. In use, the drum 17 transfers the cartridges 3 in correspondence to the welding station 19 so that each cartridge 3 (that is, each seat 70 of the drum 17 which conveys the cartridges 3) is arranged in a position facing and exactly in correspondence to the anvil and to the respective sonotrode 76. The jaws 70 of the seats release the cartridges 3 and the welding is performed by way of lifting the cartridge 3 achieved by the respective anvil.

Finally, the delivery drum 17 delivers the finished cartridges 3 to a U-shaped conveyor which overturns the single cartridges 3 (i.e. reverses the orientation) and then feeds them inside of the trays 20 which are transported by the conveyor 21 which also acts as intermediate accumulator up until the machine 22 for packaging the blister packs 1.

As illustrated in FIGS. 14 and 15, the machine 22 for packaging the blister packs 1 comprises a line for feeding the electronic cigarettes 2 in which a belt conveyor 77 receives a continuous and orderly mass of electronic cigarettes 2 (in particular two rows of electronic cigarettes 2 spaced apart and arranged next to each other) from a store (not illustrated) and a line for feeding the cartridges 3 comprising a hopper 78 in which the cartridges 3, transported by the trays 20, are released and collected, which feeds a belt conveyor 79 that receives an orderly mass of ten rows of cartridges 3 arranged next to each other. The belt conveyor 77 is arranged parallel to the belt conveyor 79.

The two belt conveyors 77, 79 are in turn arranged orthogonally to a continuous strip 80 of plastic material unwound from a coil and having multiple separate pockets 81\*, **81\*\* for housing both the electronic cigarettes 2 and the cartridges 3**.

The packaging machine 22 comprises a transfer unit 82 interposed between the conveyor 79 and the continuous strip 80 and provided with a multiplicity of sucking members 83 for collecting a multiplicity of rows of cartridges 3 (in particular, three rows for ten cartridges 3) and for transferring them inside the pockets 81\* obtained in the continuous strip 80 of plastic material.

In a similar way, the packaging machine 22 comprises a transfer unit 84, placed downstream of the transfer unit 82 and interposed between the conveyor 77 and the continuous strip 80 and provided with a multiplicity of sucking members 85 for withdrawing a multiplicity of electronic cigarettes 2 (in particular, three rows of two electronic cigarettes 2) and to transfer them inside the pockets **81\*\*** obtained in the continuous strip of plastic material.

Downstream of the transfer unit 84 a continuous strip 86 of metallic material is fed which acts as a support layer for the blister pack 1 and which is unwound from a coil 87 and is superimposed perfectly to the strip 80 of plastic material.

The assembly formed by the strip 80 of plastic material and by the continuous strip 86 of metallic material which acts as a support layer is supplied to a welding device 88 comprising two welding plates 89. The two welding plates 89 are internally provided with cutting members to achieve, during the execution of the welding, both a transverse cut and a longitudinal cut so as to separate the single blister packs 1.

The single blister packs 1 are then fed to a further cutting device 90 provided with incising members to obtain the two pre-cut lines 4*, 4** parallel one to the other.

The blister pack 1 exiting from the cutting device 90 are fed to a belt conveyor 91 which receives an orderly mass of blister packs 1 (in particular three rows of blister packs arranged next to each other); along the belt conveyor 91 a folding station (not illustrated) is provided, in which the end portion of each blister pack 1 is folded along the pre-cut line 4** and overturned by 180°.

The packaging machine 22 comprises a transfer unit 92 interposed between the belt conveyor 91 and a further continuous belt conveyor 93 arranged orthogonally to the belt conveyor 91. The transfer unit 92 is provided with sucking members 94 for collecting a multiplicity of blister packs 1 (in particular, three blister packs 1) and for transferring on the further continuous conveyor 93 a single row of blister packs 1 aligned one with the other.

Finally, the packaging machine 22 comprises a folding wheel 97 which is rotating at a predetermined pitch about a respective horizontal rotation axis for receiving in succession the blanks 98 of a casing made of cardboard which are fed by a feeding line. The blanks 98 are partially folded around the spindles of the folding wheel 97 until obtaining tubular wrappers 99 that are subsequently transferred inside the pockets 100 of a wrapping wheel 101 in correspondence to a transfer station. The wrapping wheel 101 is mounted to rotate at a predetermined pitch about a respective horizontal rotation axis and comprises a plurality of peripheral pockets 100, each of which at first receives a blank 98 partially folded into a tubular wrapping 99 and subsequently a blister pack 1 which is inserted into a tubular wrapping 99. The wrapping wheel 101 completes the folding of the blank 98 around the respective blister pack 1.

It appears evident that, in order to increase the productivity of the plant 10, it is possible to increase the number of seats 23 which are obtained on the periphery of the drum 12 and are divided into groups by distributing them on a number of lines or rows. For example, each group can have three rows of ten seats 23 arranged essentially in a line so that each group comprises thirty seats 23 simultaneously subjected to subsequent processes. It is also clear that, in this case, the manufacturing machine 11 is provided with a number (for example, equal to three) of filling units 14 arranged in correspondence to the filling station FS for feeding a quantity of powdered tobacco inside each empty casing 5 and a number (for example, equal to three) of the feeding units 16 (or a number of stores 58) arranged in correspondence to the second station FRS to insert from above a portion 8 of filtering material inside each casing 5.

The plant 10 for the production of blister packs 1 described above has numerous advantages.

In the first place, the plant 10 for the production of blister packs 1 described above allows to reach high hourly productivity (that is, a number of blister packs 1 per the time unit) while ensuring a high quality standard.

In particular, it is possible to ensure high quality standards and uniformity in manufacturing the cartridges 3. Said result is obtained by operating the machine 11 to manufacture the cartridges 3 in parallel, i.e. advancing along the various stations a plurality of cartridges 3 (in particular ten cartridges 3) which are simultaneously subjected to different steps of the manufacturing process (such as for example the filling with powdered tobacco, weighing, the inserting of the piece of filtering material 8, the coupling with the closing ring nut 9 and the subsequent sealing).

In this way the manufacturing of the cartridges 3 takes place under the most favourable conditions since all steps of the manufacturing process require a long enough time to take place in an optimum manner, that is, to allow filling with a predetermined quantity of tobacco at a certain density, to avoid deformations of the portions 8 of the filtering material and to prevent unwanted overflow or the leaking of powdered tobacco from the casings 5.

Furthermore, the plant 10 for the production of blister packs described above is formed by structurally simple elements and provides appropriate manoeuvring space needed both around the machine 11 to manufacture the cartridges 3 and around the machine 22 for the production of the blister packs 1 and thus both the initial assembly, and the subsequent maintenance operations (from simple cleaning to replacement) are simplified.

The invention claimed is:

1. A machine (11) to manufacture cartridges (3) for electronic cigarettes (2) comprising a casing (5) made of plastic material having a microperforated bottom wall (6) and a side wall (7) and containing a quantity of powdered tobacco on top of which a portion (8) of filtering material is arranged; the manufacturing machine (11) comprises:
   a feeding conveyor (13) which feeds a plurality of empty casings (5) in correspondence to a collecting station (PS);
   a first drum (12) rotating at a predetermined pitch around its own vertical rotation axis, which receives an orderly mass of empty casings (5) from the feeding conveyor (13), in correspondence to the collecting station (PS), and feeds them through a succession of processing stations (FS, WRS, FRS, CDS, CS); wherein the first drum (12) is provided with a plurality of peripheral first seats (23), each designed to receive a respective casing (5), and which are divided into groups comprising the same number of first seats (23); in which the casings (5) of the first seats (23) of a same group are simultaneously subjected to the processes in correspondence to the succession of the processing stations (FS, WRS, FRS, CDS, CS); and
   a second drum configured to receive semi-finished cartridges (3) transferred from the first drum (12) to the second drum (17) in correspondence to a loading/unloading station (CDS) in which the first drum (12) partially overlaps the second drum (17), wherein the second drum (17) is provided with a number of second seats (70) obtained on the periphery of the second drum (17) and which are divided into groups.

2. The machine according to claim 1, wherein the first seats (23) of the same group are arranged in line so as to form, in plan view, a polygon on the surface of the first drum (12).

3. The machine according to claim 1, wherein the manufacturing machine (11) comprises a first filling unit (14) arranged in correspondence to a first filling station (FS) downstream of the collecting station (PS), so as to feed a quantity of powdered tobacco inside each empty casing (5) from above.

4. The machine according to claim 3, wherein the first filling unit (14) comprises a hopper (28) for the collection of powdered tobacco and a plurality of discs (32, 34, 40, 42) among which a first disc (32) defining a bottom wall of the first hopper (28); wherein between the first disc (32) and a second disc (34) a plurality of compartments (S) is defined, each designed to contain the quantity of powdered tobacco to be inserted into a respective casing (5) from above; and wherein the first disc (32) and the second disc (34) are mobile relative to one another, so as to vary the volume of the compartments (S) and the quantity of powdered tobacco contained inside them.

5. The machine according to claim 3, wherein the manufacturing machine (11) comprises a weighing unit (15) for weighing each casing (5) and discarding the single casings (5) which do not conform and is arranged in correspondence to a weighing and discarding station (WRS) downstream of the first filling station (FS).

6. The machine according to claim 5, wherein the manufacturing machine (11) comprises a second feeding unit (16) which is arranged in correspondence to a second feeding station (FRS) downstream of the weighing and discarding station (WRS), so as to feed a portion (8) of filtering material inside each casing (5) from above.

7. The machine according to claim 6, wherein the second feeding unit (16) comprises a bent panel (57) which receives rods of filtering material divided into portions (8) of desired length with a horizontal axis and releases them to a store (58) which is divided into a number of channels (59); wherein each of said channels (59) comprises a stack of portions (8) of filtering material arranged one on top of the other with a vertical axis; and wherein the second feeding unit (16) comprises a lower guide (64) associated with the store (58) and cooperating with a first arm (66), which is mobile in a horizontal direction for inserting a portion (8) of filtering material inside each casing (5) from above.

8. The machine according to claim 1 wherein the second drum (17) rotates at a predetermined pitch around its own vertical rotation axis, and receives the casings (5) from the first drum (12), containing a quantity of powdered tobacco on top of which a portion (8) of filtering material is arranged, in correspondence to the loading/unloading station (CDS) and feeds an orderly mass of cartridges (3) to a second transfer conveyor (21).

9. The machine according to claim 8, wherein each second seat (70) is designed to receive a respective casing (5) from the first drum (12) in correspondence to the loading/unloading station (CDS), and the second seats (70) are divided into groups comprising the same number of second seats (70) arranged essentially in line so as to form, in plain view, a polygon on the surface of the second drum (17).

10. The machine according to claim 8, wherein the cartridges (3) comprise a closing ring nut (9); and the manufacturing machine (11) comprises a third feeding unit (18) arranged in correspondence to a third filling station (CS) downstream of the loading/unloading station (CDS) along the periphery of the second drum (17) so as to feed a closing ring nut (9) to each cartridge (3) from above.

11. The machine according to claim 10 and comprising a plurality of sonotrodes (76) arranged downstream of the third filling station (CS) along the periphery of the second drum (17) so as to weld the closing ring nuts (9) on the cartridges (3) by means of ultrasonic welding.

* * * * *